US012634035B2

(12) United States Patent
Li

(10) Patent No.: US 12,634,035 B2
(45) Date of Patent: May 19, 2026

(54) CONTROL CHANNEL ALLOCATION METHOD AND COMMUNICATION DEVICE

(71) Applicant: VIVO MOBILE COMMUNICATION CO., LTD., Dongguan (CN)

(72) Inventor: Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 221 days.

(21) Appl. No.: 18/374,762

(22) Filed: Sep. 29, 2023

(65) Prior Publication Data

US 2024/0022348 A1 Jan. 18, 2024

Related U.S. Application Data

(63) Continuation of application No. PCT/CN2022/083019, filed on Mar. 25, 2022.

(30) Foreign Application Priority Data

Mar. 31, 2021 (CN) .......................... 202110351587.0

(51) Int. Cl.
*H04L 1/00* (2006.01)
*H04W 72/0446* (2023.01)
(Continued)

(52) U.S. Cl.
CPC ....... *H04L 1/0038* (2013.01); *H04W 72/0446* (2013.01); *H04W 72/0453* (2013.01); *H04W 72/232* (2023.01)

(58) Field of Classification Search
CPC .............. H04L 1/0038; H04W 72/232; H04W 72/0446; H04W 72/0453
See application file for complete search history.

(56) References Cited

U.S. PATENT DOCUMENTS 11,212,736 B2 12/2021 Xu et al.
11,638,246 B2 4/2023 Hamidi-Sepehr et al.
(Continued)

FOREIGN PATENT DOCUMENTS

CN 110474743 A 11/2019
CN 111869287 A 10/2020
(Continued)

OTHER PUBLICATIONS

Nokia et al., "On reducing the PDC CH channel estimation and BD complexity in NR", 3GPP TSG RAN WG1 Ad Hoc 1801, Vancouver, Canada, Jan. 22-26, 2018, R1-1800550.
(Continued)

*Primary Examiner* — Melvin C Marcelo
(74) *Attorney, Agent, or Firm* — The Webb Law Firm

(57) ABSTRACT

A control channel allocation method includes determining, by a communication device, a first blind detection resource budget of a first search space set on a first time unit; and performing, by the communication device, candidate PDCCH allocation on the first search space set according to the first blind detection resource budget and a first allocation rule. The first blind detection resource budget includes at least one of a candidate PDCCH budget or a CCE budget. The first allocation rule is related to a search space-related index. The first time unit includes K second time units, and K is a positive integer. The first time unit includes a slot group, and the second time unit includes a slot.

20 Claims, 4 Drawing Sheets

A communication device determines a first blind detection resource budget of a first search space set on a first time unit — 201

The communication device performs candidate PDCCH allocation on the first search space set according to the first blind detection resource budget and a first allocation rule — 202

(51) Int. Cl.
  *H04W 72/0453* (2023.01)
  *H04W 72/232* (2023.01)

(56) References Cited

U.S. PATENT DOCUMENTS

| 2020/0154412 | A1 | 5/2020 | Lee et al. |
| 2020/0221449 | A1 | 7/2020 | Bang et al. |
| 2021/0084620 | A1 | 3/2021 | Tooher et al. |
| 2021/0250917 | A1 | 8/2021 | Takeda et al. |
| 2022/0294578 | A1 | 9/2022 | Kim et al. |

FOREIGN PATENT DOCUMENTS

| CN | 111937344 A | 11/2020 | |
| CN | 112514309 A | 3/2021 | |
| WO | WO-2019214722 A1 * | 11/2019 | ........... H04L 5/0053 |
| WO | 2020200177 A1 | 10/2020 | |
| WO | 2020227142 A1 | 11/2020 | |
| WO | 2021034086 A1 | 2/2021 | |

OTHER PUBLICATIONS

Nokia et al., "On NR operation under PDC CH channel estimation and BD limits", 3GPP TSG RAN WG1 Ad Hoc #92, Athens, Greece, Feb. 26-Mar. 2, 2018, R1-1802537.

Oppo, "Remaining issues on Search Space", 3GPP TSG RAN WG1 Meeting #92bis, Sanya, Chona, Apr. 16-20, 2018, R1-1803988.

* cited by examiner

Network side
device

11        Terminal

11

Terminal

A communication device determines a first blind detection resource budget of a first search space set on a first time unit ⟋ 201

The communication device performs candidate PDCCH allocation on the first search space set according to the first blind detection resource budget and a first allocation rule ⟋ 202

CONTROL CHANNEL ALLOCATION METHOD AND COMMUNICATION DEVICE

CROSS-REFERENCE TO RELATED APPLICATIONS

This application is a Bypass Continuation Application of International Application No. PCT/CN2022/083019 filed Mar. 25, 2022, and claims priority to Chinese Patent Application No. 202110351587.0 filed Mar. 31, 2021, the disclosures of which are hereby incorporated by reference in their entireties.

BACKGROUND OF THE INVENTION

Field of the Invention

This application pertains to the field of communication technologies, and particularly relates to a control channel allocation method and apparatus, and a communication device.

Description of Related Art

A network side device may configure one or more search spaces (SS) for a terminal (which may also be referred to as user equipment (UE)). The terminal may perform blind detection on a physical downlink control channel (PDCCH) by using various radio network temporary identifiers (RNTI) according to the configured SS, and demodulate downlink control information (DCI) to obtain scheduling information of each cell.

SUMMARY OF THE INVENTION

According to a first aspect, a control channel allocation method is provided, and the method includes:

determining, by a communication device, a first blind detection resource budget of a first search space set on a first time unit, where the first blind detection resource budget includes at least one of a candidate physical downlink control channel (PDCCH) budget or a control channel element (CCE) budget; and performing, by the communication device, candidate PDCCH allocation on the first search space set according to the first blind detection resource budget and a first allocation rule, where the first allocation rule is related to at least one of: a search space-related index, a time domain index of a second time unit, or a frequency domain index of a first frequency unit; and the first time unit includes K second time units, a frequency associated with the first search space set includes M first frequency units, and both K and M are positive integers.

According to a second aspect, a control channel allocation apparatus is provided, and the apparatus includes:

a determining module, configured to determine a first blind detection resource budget of a first search space set on a first time unit, where the first blind detection resource budget includes at least one of a candidate physical downlink control channel (PDCCH) budget or a control channel element (CCE) budget; and an allocation module, configured to perform candidate PDCCH allocation on the first search space set according to the first blind detection resource budget and a first allocation rule, where the first allocation rule is related to at least one of: a search space-related index, a time domain index of a second time unit, or a frequency domain index of a first frequency unit; and the first time unit includes K second time units, a frequency associated with the first search space set includes M first frequency units, and both K and M are positive integers.

According to a third aspect, a communication device is provided. The communication device includes a processor, a memory, and a program or an instruction stored in the memory and executable on the processor, where when the program or the instruction is executed by the processor, the steps of the method in the first aspect are implemented.

According to a fourth aspect, a communication device is provided, including a processor and a communication interface, where the processor is configured to: determine a first blind detection resource budget of a first search space set on a first time unit, where the first blind detection resource budget includes at least one of a candidate physical downlink control channel (PDCCH) budget or a control channel element (CCE) budget; and the communication interface is configured to perform candidate PDCCH allocation on the first search space set according to the first blind detection resource budget and a first allocation rule, where the first allocation rule is related to at least one of: a search space-related index, a time domain index of a second time unit, or a frequency domain index of a first frequency unit; and the first time unit includes K second time units, a frequency associated with the first search space set includes M first frequency units, and both K and M are positive integers.

According to a fifth aspect, a non-transitory computer-readable storage medium is provided, where a program or an instruction is stored in the non-transitory computer-readable storage medium, and the program or the instruction is executed by a processor to implement the steps of the method in the first aspect.

According to a sixth aspect, a chip is provided. The chip includes a processor and a communication interface, where the communication interface is coupled to the processor, and the processor is configured to execute a program or an instruction to implement the steps of the method in the first aspect.

According to a seventh aspect, a computer program or program product is provided. The computer program or program product is stored in a non-volatile storage medium, and the program or program product is executed by at least one processor to implement the steps of the method in the first aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "I" generally represents an "or" relationship between associated objects.

It should be noted that, the technologies described in the embodiments of this application are not limited to a Long Term Evolution (LTE)/LTE-Advanced (LTE-A) system, and can also be used in other wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a new radio (NR) system for example purposes, and NR terms are used in most of the following descriptions, but these technologies can also be applied to an application other than an NR system application, for example, a 6-th generation (6G) communication system.

Figure 1:
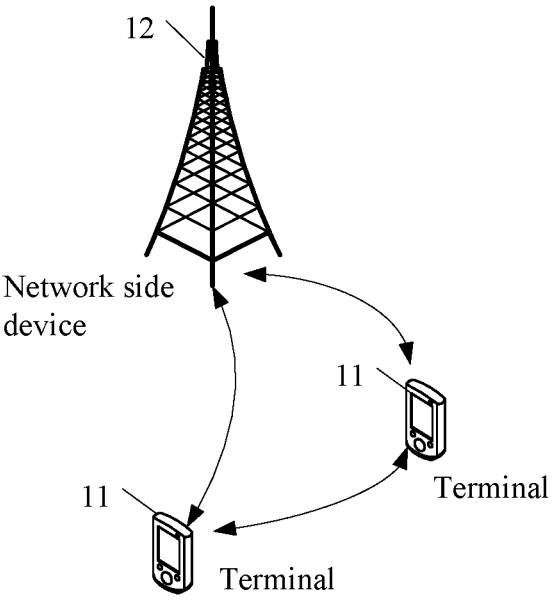
FIG. 1 is a block diagram of a wireless communication system to which the embodiments of this application can be applied.

FIG. 1 is a block diagram of a wireless communication system to which embodiments of this application can be applied. The wireless communication system includes a terminal 11 and a network side device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a smart watch, a bracelet, a headset, glasses, and the like. It should be noted that a type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a type of the base station is not limited.

For ease of understanding, the following describes related content in the embodiments of this application.

Blind detection (BD)/control channel element (CCE) budget of a physical downlink control channel (PDCCH) of NR:

For a PDCCH candidate of a search space (SS) whose search space identifier (ID) is Sj on a corresponding carrier for nCI scheduling, if a PDCCH candidate with a relatively small sequence number in the SS or a PDCCH candidate in another SS with a relatively small SS ID completely overlaps with a CCE of the PDCCH candidate, and scrambling, a DCI format, and a size are all the same, which are not calculated in the PDCCH candidate of PDCCH monitoring.

For a single cell operation, a maximum quantity of BD PDCCH candidates per slot in each cell may be shown in Table 1:

TABLE 1

| μ | Maximum quantity $M_{PDCCH}^{max,slot,\mu}$ of PDCCH candidates per slot in each cell |
|---|---|
| 0 | 44 |
| 1 | 36 |
| 2 | 22 |
| 3 | 20 |

It is considered that CCEs do to overlap if the following two conditions are met: (1) control resource set (CORESET) indexes are different; (2) first symbols of PDCCH candidates corresponding to the CCEs are different.

For a single cell operation, a maximum quantity of BD non-overlapping CCEs per slot in each cell may be shown in Table 2:

TABLE 2

| μ | Maximum quantity $C_{PDCCH}^{max,slot,\mu}$ of non-overlapping CCEs per slot in each cell |
|---|---|
| 0 | 56 |
| 1 | 56 |
| 2 | 48 |
| 3 | 32 |

For UE in a release 16 (Rel-16), if the UE reports a capability of supporting a span gap (for example, pdcch-Monitoring-r16), the UE further needs to meet a BD or CCE limit per span, where a maximum quantity of BD PDCCH candidates per span in each cell may be shown in Table 3, and a maximum quantity of BD non-overlapping CCEs per span in each cell is shown in Table 4, where X in a combination (X, Y) represents a distance between two consecutive spans, and Y represents a length per span.

TABLE 3

| $M_{PDCCH}^{max,(X,Y),\mu}$ | (X,Y) | | |
|---|---|---|---|
| $\mu$ | (2, 2) | (4, 3) | (7, 3) |
| 0 | 14 | 28 | 44 |
| 1 | 12 | 24 | 36 |

TABLE 4

| $M_{PDCCH}^{max,(X,Y),\mu}$ | (X,Y) | | |
|---|---|---|---|
| $\mu$ | (2, 2) | (4, 3) | (7, 3) |
| 0 | 18 | 36 | 56 |
| 1 | 18 | 36 | 56 |

If the UE reports a plurality of (X, Y), after determining a span pattern, the UE determines a (X, Y) combination that meets the span limitation, and uses a maximum limit value of these (X, Y) as a BD or CCE limitation of the span.

For each serving cell, the UE may be configured with monitoringCapabilityConfig. When r15monitoringcapability is configured or monitoringCapabilityConfig is not configured, a BD/CCE budget limit per slot is applied. Otherwise, a BD/CCE budget limit per span is applied.

Overbooking of a PDCCH of NR:

In an NR release 15 (Rel-15), for self-scheduling of a primary cell (PCell), the UE does not expect a common search space (CSS) configured on the Pcell to exceed the foregoing limit per slot. In addition, a sum of a CSS and a UE-specific search space (USS) of the scheduling Pcell configured in the Pcell may exceed the foregoing limit per slot, that is, overbooking.

In NR Rel-16, if a Pcell is configured with monitoring per span, the UE does not expect a CSS configured in the Pcell to exceed the foregoing limit per span, and does not expect a BD/CCE on a span other than the first span per slot to exceed the foregoing limit per span. In addition, overbooking may be performed on the first span per slot based on a sum of a configured CSS and a configured USS in the scheduling Pcell in the Pcell.

Multi-Slot based BD/CCE budget limit in NR:

The multi-slot BD/CCE budget limit may include the following several manners:

Manner 1: The BD/CCE budget limit is in a slot group including Y slot, and the slot group is fixedly connected back and forth.

Manner 2: The BD/CCE budget limit is in a slot group including no more than Y slots, and each slot group does not overlap.

Manner 3: The BD/CCE budget limit is in a slot group including Y slots, and each slot group is obtained through sliding in units of L slots.

Y is an integer greater than 1, and L is a positive integer less than Y.

With reference to the accompanying drawings, the following describes in detail a control channel allocation method provided in the embodiments of this application by using some embodiments and application scenarios thereof.

Usually, to reduce complexity of blind detection by the terminal, a new radio (NR) system specifies a blind detection capability of the terminal, that is, a maximum quantity of candidate PDCCs (that is, PDCCH candidate) for blind detection by the terminal on each time unit per cell (per serving cell), and a maximum quantity of channel estimates required for blind detection by the terminal on each time unit of each cell, that is, a quantity of non-overlapping control channel elements (CCE), where the foregoing time unit may include a slot, a span (including a plurality of symbols), and the like.

Currently, to simplify configuration complexity of the network side device and make full use of the blind detection capability of the terminal, the network side device is allowed to exceed the blind detection capability of the terminal for a search space configured on each time unit, that is, overbooking. However, there is no related solution to how to perform candidate PDCCH allocation in a search space in the case of overbooking.

Figure 2:
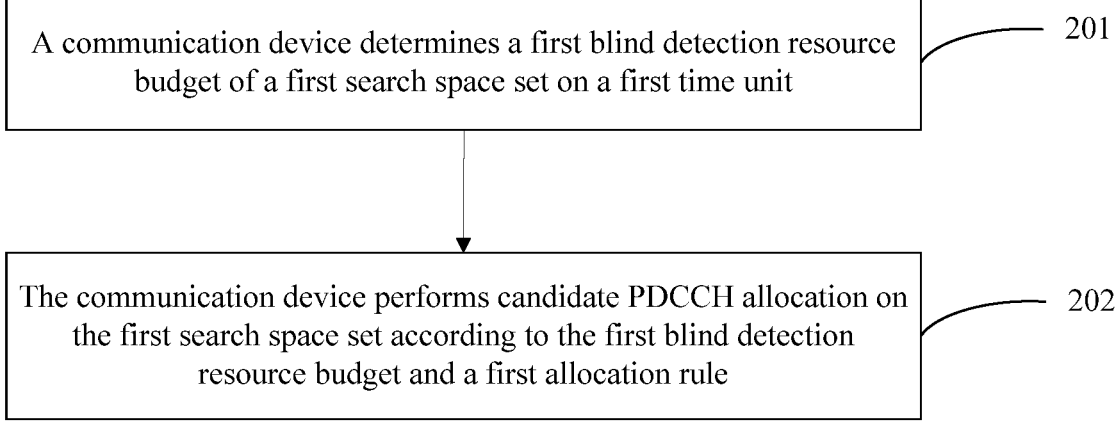
FIG. 2 is a flowchart of a control channel allocation method according to an embodiment of this application.

Referring to FIG. 2, FIG. 2 is a flowchart of a control channel allocation method according to an embodiment of this application. The method may be performed by a communication device. The communication device may be a terminal or a network side device.

As shown in FIG. 2, the control channel allocation method provided in this embodiment of this application may include the following steps:

Step 201: The communication device determines a first blind detection resource budget of a first search space set on a first time unit, where the first blind detection resource budget includes at least one of a candidate physical downlink control channel (PDCCH) budget or a control channel element (CCE) budget.

In this embodiment, the first search space set may include at least one search space in a search space set of a terminal, for example, a USS in the search space set of the terminal. The search space set of the terminal is a search space set configured by the network side device for the terminal. For example, if the communication device is a terminal, before step 201, the terminal may first receive the configuration of the search space set from the network side device. If the communication device is a network side device, before step 201, the network side device may send the configuration of the search space set to the terminal.

The first time unit may include but is not limited to a radio frame, a slot group, a symbol group, a slot, a symbol, or the like. For example, the first time unit may include K slots, and K is an integer greater than 1. It should be noted that different first time units may overlap or may not overlap in time domain. This is not limited in this embodiment.

The blind detection resource budget may also be referred to as a blind detection resource limit, and may be understood as a limit value of a quantity of blind detection resources, for example, a maximum value of the quantity of blind detection resources or a minimum value of the quantity of blind detection resources. The blind detection resource may include at least one of a candidate PDCCH (that is, PDCCH candidate) or a CCE. The first blind detection resource budget is a blind detection resource budget of the first search space set on the first time unit, and includes at least one of the candidate PDCCH budget or the CCE budget. The candidate PDCCH budget may also be referred to as a BD budget.

In this embodiment, the blind detection resource budget of the first search space set on the first time unit may be predefined in a protocol, preconfigured, or configured by the network side device, so that the communication device can directly obtain the blind detection resource budget of the first search space set on the first time unit; or the communication device can calculate the blind detection resource budget of the first search space set on the first time unit according to a total blind detection resource budget on the first time unit.

Step 202: The communication device performs candidate PDCCH allocation on the first search space set according to the first blind detection resource budget and a first allocation rule, where the first allocation rule is related to at least one of: a search space-related index, a time domain index of a second time unit, or a frequency domain index of a first frequency unit; and the first time unit includes K second time units, a frequency associated with the first search space set includes M first frequency units, and both K and M are positive integers.

In this embodiment, the search space-related index may include but is not limited to at least one of an index of the search space, an index of a control resource set (Coreset) associated with a search space, an index of a control resource set pool associated with a search space, or the like.

The second time unit may include but is not limited to a radio frame, a slot group, a symbol group, a slot, a symbol, or the like. It should be noted that a time granularity of the second time unit may be less than a time granularity of the first time unit. For example, if the first time unit is a radio frame, the second time unit may be a slot group, a symbol group, a slot, or a symbol; if the first time unit is a slot group, the second time unit may be a symbol group, a slot, or a symbol; if the first time unit is a slot, the second time unit may be a symbol group or a symbol; or if the first time unit is a symbol group, the second time unit may be a symbol. The time domain index of the second time unit may also be referred to as a time domain location of the second time unit.

The first frequency unit may include but is not limited to a carrier, a subcarrier, a bandwidth part (BWP), a sub-bandwidth, a resource block (RB) group, or the like. The frequency domain index of the first frequency unit may also be referred to as a frequency domain location of the first frequency unit.

The first allocation rule is related to at least one of the search space-related index, the time domain index of the second time unit, or the frequency domain index of the first frequency unit. For example, the first allocation rule may be performing candidate PDCCH allocation in ascending order of time domain indexes of second time units, or may be performing candidate PDCCH allocation in a sequence of sequentially traversing all search space-related indexes for a time domain index of each second time unit.

For the foregoing step 202, for example, the communication device may allocate at least partial candidate PDCCHs of at least partial search spaces of the first search space set according to the first blind detection resource budget and the first allocation rule. It should be noted that, that the communication device performs candidate PDCCH allocation on the first search space set according to the first blind detection resource budget and the first allocation rule may be referred to as that the communication device performs candidate PDCCH mapping on the first search space set according to the first blind detection resource budget and the first allocation rule. In addition, if the communication device is a terminal, after the foregoing step 202, the terminal may perform candidate PDCCH monitoring according to a candidate PDCCH allocation result. If the communication device is a network side device, after the foregoing step 202, the network side device may perform candidate PDCCH sending according to a candidate PDCCH allocation result.

The following describes this embodiment of this application with reference to examples.

Manner 1: The first time unit is a slot group, and the first allocation rule is related to at least one of the search space-related index, the time domain index of the second time unit, or the frequency domain index of the first frequency unit.

In this manner, defining a terminal blind detection capability based on a granularity of a slot group can reduce implementation complexity of blind detection compared with defining the terminal blind detection capability based on a granularity of a slot or a span. In addition, candidate PDCCH allocation is performed according to the first blind detection resource budget and the first allocation rule that is related to at least one of the search space-related index, the time domain index of the second time unit, or the frequency domain index of the first frequency unit. This provides a manner of performing candidate PDCCH allocation in a search space in a case that PDCCH blind detection limitation is performed based on a granularity of a slot group, thereby reducing complexity of performing candidate PDCCH allocation in the search space in the case of overbooking.

Manner 2: The first time unit is a radio frame, a slot group, a symbol group, a slot, or a symbol, and the first allocation rule is related to at least one of the time domain index of the second time unit or the frequency domain index of the first frequency unit, or the first allocation rule is related to at least one of the time domain index of the second time unit, the frequency domain index of the first frequency unit or the search space-related index.

In this manner, the first allocation rule is related to at least one of the time domain index of the second time unit or the frequency domain index of the first frequency unit, or the first allocation rule is related to at least one of the time domain index of the second time unit, the frequency domain index of the first frequency unit or the search space-related index. In this way, candidate PDCCH allocation is performed based on the first blind detection resource budget and the first allocation rule, thereby reducing complexity of performing candidate PDCCH allocation in the search space in the case of overbooking.

According to the control channel allocation method provided in this embodiment of this application, a first blind detection resource budget of a first search space set on a first time unit is determined, and candidate PDCCH allocation is performed on the first search space set according to the first blind detection resource budget and a first allocation rule. This provides a manner of performing candidate PDCCH allocation in a search space in the case of overbooking, thereby reducing complexity of performing candidate PDCCH allocation in the search space in the case of overbooking.

Optionally, the search space-related index includes at least one of: an index of a search space, an index of a control resource set associated with a search space, or an index of a control resource set pool associated with a search space.

In this embodiment, the search space-related index may be an index of a search space, an index of a Coreset associated with a search space, or an index of a Coreset pool associated with a search space.

Optionally, the first allocation rule may include one of the following:

performing candidate PDCCH allocation in an allocation sequence determined according to a first index, where the first index includes the search space-related index, the time domain index of the second time unit, or the frequency domain index of the first frequency unit;

performing candidate PDCCH allocation in a sequence of sequentially traversing all third indexes for each second index, where the second index is the search space-related index, the time domain index of the second time unit, or the frequency domain index of the first frequency unit, and the third index is an index different from the second index in the search space-related index, the time domain index of the second time unit, and the frequency domain index of the first frequency unit; and performing candidate PDCCH allocation in a sequence of sequentially traversing all fifth indexes for each fourth index and sequentially traversing all sixth indexes for each fifth index, where the fourth index is the search space-related index, the time domain index of the second time unit, or the frequency domain index of the first frequency unit, the fifth index is an index different from the fourth index in the search space-related index, the time domain index of the second time unit, and the frequency domain index of the first frequency unit, and the sixth index is an index different from the fifth index and the sixth index in the search space-related index, the time domain index of the second time unit, and the frequency domain index of the first frequency unit.

In an implementation, the first allocation rule may be performing candidate PDCCH allocation in the allocation sequence determined according to the first index. For example, candidate PDCCH allocation may be performed in ascending order of first indexes, or candidate PDCCH allocation may be performed in descending order of first indexes. The following describes this implementation with reference to examples.

Manner 1: The first index is the search space-related index, and the first allocation rule may be performing candidate PDCCH allocation in ascending order of search space-related indexes, or the first allocation rule may be performing candidate PDCCH allocation in descending order of search space-related indexes.

For example, the first search space set includes J USSs, the first time unit includes K slots, and the first blind detection resource budget includes a candidate PDCCH budget B' and a CCE budget C'. The J USSs may be sorted according to indexes of search spaces to form a USS set. If a quantity of candidate PDCCEs and a quantity of non-overlapping CCEs of a $j^{th}$ USS in the USS set in the K slots are respectively B(j) and C(j), an optional implementation code for candidate PDCCH allocation may be shown as follows:

```
"Set j=0;
While B(j)<=B' and C(j)<=C' and j<J
``` allocating a candidate PDCCH of the $j^{th}$ USS in the K slots as a candidate PDCCH that the UE needs to monitor;

```
B'=B'-B(j);
C'=C'-C(j);
j=j+1;
end"
```

Manner 2: The first index is the time domain index of the second time unit, and the first allocation rule may be performing candidate PDCCH allocation in ascending order of time domain indexes of second time units, or the first allocation rule may be performing candidate PDCCH allocation in descending order of time domain indexes of second time unit.

For example, the first search space set includes J USSs, the first time unit includes K slots, the second time unit is one slot, and the first blind detection resource budget includes a candidate PDCCH budget B' and a CCE budget C'. If a quantity of candidate PDCCEs and a quantity of non-overlapping CCEs of the J USSs in a $k^{th}$ slot are respectively B(k) and C(k), an optional implementation code for candidate PDCCH allocation may be shown as follows:

```
"Set k=0;
While B(k)<=B' and C(k)<=C' and k<K
``` allocating a candidate PDCCH of the J USSs in the $k^{th}$ slot as a candidate PDCCH that the UE needs to monitor;

```
B'=B'-B(k);
C'=C'-C(k);
k=k+1;
end"
```

Manner 3: The first index is the frequency domain index of the first frequency unit, and the first allocation rule may be performing candidate PDCCH allocation in ascending order of frequency domain indexes of first frequency units, or the first allocation rule may be performing candidate PDCCH allocation in descending order of frequency domain indexes of first frequency units.

For example, the first search space set includes J USSs, a frequency associated with the J USSs includes M first frequency units, the first time unit includes K slots, the second time unit is one slot, and the first blind detection resource budget includes a candidate PDCCH budget B' and a CCE budget C'. If a quantity of candidate PDCCEs and a quantity of non-overlapping CCEs of the J USSs in the K slots on an $m^{th}$ first frequency unit are respectively B(m) and C(m), an optional implementation code for candidate PDCCH allocation may be shown as follows:

```
"Set m=0
While B(m)<=B' and C(m)<=C' and m<M
``` allocating a candidate PDCCH of the J USSs in the K slots on the $m^{th}$ first frequency unit as a candidate PDCCH that the UE needs to monitor;

```
B'=B'-B(m);
C'=C'-C(m);
m=m+1;
end"
```

In another implementation, the first allocation rule may be performing candidate PDCCH allocation in the sequence of sequentially traversing all third indexes for each second index. The following describes this implementation with reference to examples.

Manner 1: The second index is the search space-related index, the third index is the time domain index of the second time unit, and the first allocation rule is performing candidate PDCCH allocation in a sequence of sequentially traversing time domain indexes of all second time units for each search space-related index.

For example, the first search space set includes J USSs, the first time unit includes K slots, the second time unit is one slot, and the first blind detection resource budget includes a candidate PDCCH budget B' and a CCE budget C'. The J USSs may be sorted according to indexes of search spaces to form a USS set. If a quantity of candidate PDCCEs and a quantity of non-overlapping CCEs of a $j^{th}$ USS in the USS set in a $k^{th}$ slot are respectively B(j, k) and C(j, k), an optional implementation code for candidate PDCCH allocation may be shown as follows:

```
"Set k=0;
Set j=0;
While B(j, k)<=B' and C(j, k)<=C' and j<J
While B(j, k)<=B' and C(j, k)<=C' and k<K
``` allocating a candidate PDCCH of the $j^{th}$ search space in the $k^{th}$ slot as a candidate PDCCH that the UE needs to monitor;

```
B'=B'-B(j, k);
C'=C'-C(j, k);
k=k+1;
end
j=j+1;
Set k=0;
end"
```

Manner 2: The second index is the search space-related index, the third index is the frequency domain index of the first frequency unit, and the first allocation rule is performing candidate PDCCH allocation in a sequence of sequentially traversing frequency domain indexes of all first frequency units for each search space-related index.

For example, the first search space set includes J USSs, a frequency associated with a $j^{th}$ USS includes Mj first frequency units, the first time unit includes K slots, the second time unit is one slot, and the first blind detection resource budget includes a candidate PDCCH budget B' and a CCE budget C'. The J USSs may be sorted according to indexes of search spaces to form a USS set. If a quantity of candidate PDCCHs and a quantity of non-overlapping CCEs of the $j^{th}$ USS in the USS set in the K slots on an $m_j^{th}$ ($m_j$=0, 1, . . . , Mj–1) first frequency unit are respectively B(j, m j) and C(j, m j), an optional implementation code for candidate PDCCH allocation may be shown as follows:

```
"Set j=0;
Set m0=0;
While B(j, m_j)<=B' and C(j, m_j)<=C' and j<J
While B(j, m_j)<=B' and C(j, m_j)<=C' and m_j<Mj
``` allocating a candidate PDCCH of the $j^{th}$ search space in the K slots on the $m_j^{th}$ first frequency unit as a candidate PDCCH that the UE needs to monitor;

```
B'=B'-B(j, m_j);
C'=C'-C(j, m_j);
m_j=m_j+1;
end
j=j+1;
Set m_j=0;
end"
```

Manner 3: The second index is the time domain index of the second time unit, the third index is the search space-related index, and the first allocation rule is performing candidate PDCCH allocation in a sequence of sequentially traversing all search space-related indexes for a time domain index of each second time unit.

For example, the first search space set includes J USSs, the first time unit includes K slots, the second time unit is one slot, and the first blind detection resource budget includes a candidate PDCCH budget B' and a CCE budget C'. The J USSs may be sorted according to indexes of search spaces to form a USS set. If a quantity of candidate PDCCEs and a quantity of non-overlapping CCEs of a $j^{th}$ USS in the USS set in a $k^{th}$ slot are respectively B(j, k) and C(j, k), an optional implementation code for candidate PDCCH allocation may be shown as follows:

```
"Set k=0;
Set j=0;
While B(j, k)<=B' and C(j, k)<=C' and k<=K
While B(j, k)<=B' and C(j, k)<=C' and j<=J
``` allocating a candidate PDCCH of the $j^{th}$ search space in the $k^{th}$ slot as a candidate PDCCH that the UE needs to monitor;

```
B'=B'-B(j, k);
C'=C'-C(j, k);
j=j+1;
end
k=k+1;
Set j=0;
end"
```

Manner 4: The second index is the time domain index of the second time unit, the third index is the frequency domain index of the first frequency unit, and the first allocation rule is performing candidate PDCCH allocation in a sequence of sequentially traversing frequency domain indexes of all first frequency units for a time domain index of each second time unit.

Manner 5: The second index is the frequency domain index of the first frequency unit, the third index is the search space-related index, and the first allocation rule is performing candidate PDCCH allocation in a sequence of sequentially traversing all search space-related indexes for a frequency domain index of each first frequency unit.

Manner 6: The second index is the frequency domain index of the first frequency unit, the third index is the time domain index of the second time unit, and the first allocation rule is performing candidate PDCCH allocation in a sequence of sequentially traversing time domain indexes of all second time units for a frequency domain index of each first frequency unit.

In another implementation, candidate PDCCH allocation is performed in the sequence of sequentially traversing all fifth indexes for each fourth index and sequentially traversing all sixth indexes for each fifth index. The following describes this implementation with reference to examples.

Manner 1: The fourth index is the search space-related index, the fifth index is the time domain index of the second time unit, the sixth index is the frequency domain index of the first frequency unit, and the first allocation rule is performing candidate PDCCH allocation in a sequence of sequentially traversing time domain indexes of all second time units for each search space-related index and sequentially traversing frequency domain indexes of all first frequency units for a time domain index of each second time unit.

For example, the first search space set includes J USSs, a frequency associated with a $j^{th}$ USS includes Mj first frequency units, the first time unit includes K slots, the second time unit is one slot, and the first blind detection resource budget includes a candidate PDCCH budget B' and a CCE budget C'. The J USSs may be sorted according to indexes of search spaces to form a USS set. If a quantity of candidate PDCCHs and a quantity of non-overlapping CCEs of the $j^{th}$ USS in the USS set in a $k^{th}$ slot on an $m_j^{th}$ ($m_j$=0, Mj−1) first frequency unit are respectively B(j, k, m j) and C(j, k, m j), an optional implementation code for candidate PDCCH allocation may be shown as follows:

```
"Set j=0;
Set k=0;
Set m₀=0;
While B(j, k, mⱼ)<=B' and C(j, k, mⱼ)<=C' and j<J
While B(j, k, mⱼ)<=B' and C(j, k, mⱼ)<=C' and k<K
While B(j, k, mⱼ)<=B' and C(j, mⱼ)<=C' and mⱼ<Mⱼ
``` allocating a candidate PDCCH of the $j^{th}$ search space in the $k^{th}$ slot on the $m_j^{th}$ first frequency unit as a candidate PDCCH that the UE needs to monitor;

```
B'=B'−B(j, k, mⱼ);
C'=C'−C(j, k, mⱼ);
mⱼ=mⱼ+1;
end
K=k+1;
Set mⱼ=0;
end
j=j+1;
Set k=0;
end"
```

Manner 2: The fourth index is the search space-related index, the fifth index is the frequency domain index of the first frequency unit, the sixth index is the time domain index of the second time unit, and the first allocation rule is performing candidate PDCCH allocation in a sequence of sequentially traversing frequency domain indexes of all first frequency units for each search space-related index and sequentially traversing time domain indexes of all second time units for a frequency domain index of each first frequency unit.

Manner 3: The fourth index is the time domain index of the second time unit, the fifth index is the search space-related index, the sixth index is the frequency domain index of the first frequency unit, and the first allocation rule is performing candidate PDCCH allocation in a sequence of sequentially traversing all search space-related indexes for a time domain index of each second time unit and sequentially traversing frequency domain indexes of all first frequency units for each search space-related index.

Manner 4: The fourth index is the time domain index of the second time unit, the fifth index is the frequency domain index of the first frequency unit, the sixth index is the search space-related index, and the first allocation rule is performing candidate PDCCH allocation in a sequence of sequentially traversing frequency domain indexes of all first frequency units for a time domain index of each second time unit and sequentially traversing all search space-related indexes for a frequency domain index of each first frequency unit.

Manner 5: The fourth index is the frequency domain index of the first frequency unit, the fifth index is the time domain index of the second time unit, the sixth index is the search space-related index, and the first allocation rule is performing candidate PDCCH allocation in a sequence of sequentially traversing time domain indexes of all second time units for a frequency domain index of each first frequency unit and sequentially traversing all search space-related indexes for a time domain index of each second time unit.

Manner 6: The fourth index is the frequency domain index of the first frequency unit, the fifth index is the search space-related index, the sixth index is the time domain index of the second time unit, and the first allocation rule is performing candidate PDCCH allocation in a sequence of sequentially traversing all search space-related indexes for a frequency domain index of each first frequency unit and sequentially traversing time domain indexes of all second time units for each search space-related index.

Optionally, the performing, by the communication device, candidate PDCCH allocation on the first search space set according to the first blind detection resource budget and a first allocation rule includes:

performing, by the communication device, candidate PDCCH allocation on the first search space set according to the first allocation rule until a quantity of allocated blind detection resources reaches the first blind detection resource budget.

In this embodiment, the communication device may perform candidate PDCCH allocation on the first search space set according to the first allocation rule until the quantity of allocated blind detection resources reaches the first blind detection resource budget. For example, the communication device may perform candidate PDCCH allocation on the first search space set in the allocation sequence determined according to the first index, until the quantity of allocated blind detection resources reaches the first blind detection resource budget; or the communication device may perform candidate PDCCH allocation on the first search space set in the sequence of sequentially traversing all third indexes for each second index, until the quantity of allocated blind detection resources reaches the first blind detection resource budget; or the communication device may perform candidate PDCCH allocation on the first search space set in the sequence of sequentially traversing all fifth indexes for each fourth index and sequentially traversing all sixth indexes for each fifth index, until the quantity of allocated blind detection resources reaches the first blind detection resource budget.

For example, the terminal or the network side device may perform candidate PDCCH allocation on the first search space set in ascending order of search space-related indexes of the first search space set, until a quantity of allocated candidate PDCCHs reaches the candidate PDCCH budget or a quantity of allocated non-overlapping CCEs reaches the CCE budget; or the terminal or the network side device may perform candidate PDCCH allocation on the first search space set in ascending order of time domain indexes of second time units within the first time unit, until a quantity of allocated candidate PDCCHs reaches the candidate PDCCH budget or a quantity of allocated non-overlapping CCEs reaches the CCE budget.

Optionally, the first search space set includes at least one of at least one common search space CSS in a third search space set or at least one specific search space USS in the third search space set; and the third search space set is a search space set in which a third serving cell set schedules a fourth serving cell set.

In this embodiment, the first serving cell may include one or more serving cells, and the second serving cell set may also include one or more serving cells.

The first search space set includes at least one of the at least one CSS or the at least one USS in the third search space set. For example, the first search space set may include all USSs or specific USSs in the third search space set.

Optionally, the first blind detection resource budget is determined according to a total blind detection resource budget on the first time unit and a first quantity of blind detection resources; and the first quantity of blind detection resources is a quantity of blind detection resources of a second search space set on the first time unit, and the second search space set and the first search space set respectively include different search spaces in a search space set of a terminal.

In this embodiment, the total blind detection resource budget on the first time unit may be predefined in a protocol, preconfigured, or configured by the network side device. The second search space set and the first search space set respectively include different search spaces in the search space set of the terminal. For example, the second search space set may include a CSS in the search space set of the terminal, and the first search space set may include a USS in the search space set of the terminal.

The first quantity of blind detection resources is the quantity of blind detection resources of the second search space set on the first time unit. For example, the first quantity of blind detection resources may be a weighted value of a quantity of blind detection resources of each search space in the second search space set on the first time unit, where a weighted coefficient may be properly set according to an actual situation. It can be understood that if the weighting coefficient is 1, the first quantity of blind detection resources is a sum of quantities of blind detection resources of all search spaces in the second search space set on the first time unit.

The first blind detection resource budget may be a difference between the total blind detection resource budget and the first quantity of blind detection resources. For example, a difference between a total candidate PDCCH budget and a quantity of candidate PDCCs of the second search space set on the first time unit is a candidate PDCCH budget of the first search space set on the first time unit, and a difference between a total CCE budget and a quantity of CCEs of the second search space set on the first time unit is a CCE budget of the first search space set on the first time unit.

Optionally, the second search space set includes at least one of at least one common search space CSS in a fourth search space set or at least one specific search space USS in the fourth search space set; and the fourth search space set is a search space set in which a third serving cell set schedules a fourth serving cell set.

In this embodiment, the third serving cell may include one or more serving cells, and the fourth serving cell set may also include one or more serving cells.

The second search space set includes at least one of the at least one CSS or the at least one USS in the fourth search space set. For example, the second search space set may include all CSSs or specific CSSs in the fourth search space set.

It can be understood that the first search space set and the second search space set may respectively include different search spaces in the fourth search space set.

Optionally, the first search space set includes the at least one USS in the fourth search space set, and the second search space set includes the at least one CSS in the fourth search space set.

For example, the first search space set may include all USSs or specific USSs of a scheduling Pcell in a Pcell, and the second search space set may include all CSSs of the scheduling Pcell in the Pcell.

Optionally, the first time unit includes at least one second time unit to which a candidate PDCCH has been allocated and at least one second time unit to which a candidate PDCCH is to be allocated.

Figure 3:
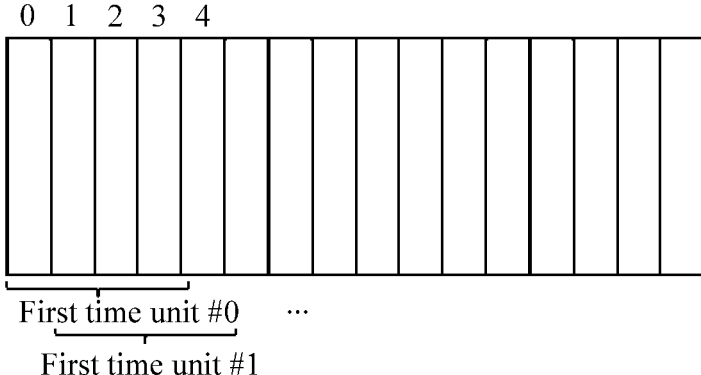
FIG. 3 is a schematic diagram of overlapping of different first time units in time domain according to an embodiment of this application.

In actual application, in a case that different first time units overlap in time domain, a case that candidate PDCCHs have been allocated to partial second time units within the first time unit and candidate PDCCHs are to be allocated to partial second time units within the first time unit occurs. For example, as shown in FIG. 3, the first time unit includes four slots, the second time unit includes one slot, and sliding is performed at a granularity of one slot. There are overlapping slots (slot #1, slot #2, and slot #3) in time domain between a first time unit #0 (slot #0, slot #1, slot #2, and slot #3) and a first time unit #1 (slot #1, slot #2, slot #3, and slot #4). When candidate PDCCH allocation is performed on the first time unit #1, if candidate PDCCHs have been allocated to slot #1, slot #2, and slot #3 when candidate PDCCH allocation is performed on the first time unit #0, candidate PDCCH allocation is not performed in slot #4, that is, the first time unit #1 includes a second time unit to which a candidate PDCCH has been allocated, namely, slot #1, slot #2, slot #3, and a second time unit to which a candidate PDCCH is to be allocated, namely, slot #4.

In this embodiment, in a case that the first time unit includes the at least one second time unit to which the candidate PDCCH has been allocated and the at least one second time unit to which the candidate PDCCH is to be allocated, the communication device may still perform candidate PDCCH allocation on the first search space set on both the second time unit to which the candidate PDCCH has been allocated and the second time unit to which the candidate PDCCH is to be allocated, that is, re-perform candidate PDCCH allocation on the second time unit to which the candidate PDCCH has been allocated; or may perform candidate PDCCH allocation on the first search space set only on the second time unit to which the candidate PDCCH is to be allocated and maintain candidate PDCCH allocation on the second time unit to which the candidate PDCCH has been allocated.

In addition, in a case that candidate PDCCH allocation is performed on the first search space set only on the second time unit to which the candidate PDCCH is to be allocated, the communication device may still perform, according to the first blind detection resource budget and the first allocation rule, candidate PDCCH allocation on the first search space set on the second time unit to which the candidate PDCCH is to be allocated; or calculate, according to the first blind detection resource budget and a quantity of allocated blind detection resources of the first search space set on the second time unit to which the candidate PDCCH has been allocated, a remaining blind detection resource budget of the first search space set on the second time unit to which the candidate PDCCH is to be allocated and perform, according to the remaining blind detection resource budget and the first allocation rule, candidate PDCCH allocation on the first search space set on the second time unit to which the candidate PDCCH is to be allocated.

Optionally, the method may further include:

calculating, by the communication device according to the first blind detection resource budget and a quantity of allocated blind detection resources of the first search space set on the second time unit to which the candidate PDCCH has been allocated, a remaining blind detection resource budget of the first search space set on the second time unit to which the candidate PDCCH is to be allocated.

In this embodiment, the remaining blind detection resource budget of the first search space set on the second time unit to which the candidate PDCCH is to be allocated may be a difference between the first blind detection resource budget and the quantity of allocated blind detection resources of the first search space set on the second time unit to which the candidate PDCCH has been allocated. For example, a difference between a candidate PDCCH budget of the first search space set on the first time unit and a quantity of allocated candidate PDCCs of the first search space set on the second time unit to which the candidate PDCCH has been allocated is a remaining candidate PDCCH budget of the first search space set on the second time unit to which the candidate PDCCH is to be allocated, and a difference between a CCE budget of the first search space set on the first time unit and a quantity of allocated CCEs of the first search space set on the second time unit to which the candidate PDCCH has been allocated is a remaining CCE budget of the first search space set on the second time unit to which the candidate PDCCH is to be allocated.

For example, after the remaining blind detection resource budget is obtained, candidate PDCCH allocation may be performed, according to the remaining blind detection resource budget and the first allocation rule, on the first search space set on the second time unit to which the candidate PDCCH is to be allocated, so that rationality of candidate PDCCH allocation can be improved.

Optionally, the performing, by the communication device, candidate PDCCH allocation on the first search space set according to the first blind detection resource budget and a first allocation rule may include:

performing, by the communication device according to the remaining blind detection resource budget and the first allocation rule, candidate PDCCH allocation on the first search space set on the second time unit to which the candidate PDCCH is to be allocated, and maintaining candidate PDCCH allocation of the first search space set on the second time unit to which the candidate PDCCH has been allocated.

In this embodiment, the communication device may perform, according to the foregoing remaining blind detection resource budget and the first allocation rule, candidate PDCCH allocation on the first search space set only on the second time unit to which the candidate PDCCH is to be allocated, and reserve candidate PDCCH allocation of the first search space set on the second time unit to which the candidate PDCCH has been allocated, so that efficiency of candidate PDCCH allocation can be improved.

Optionally, different first time units overlap in time domain, or different first time units do not overlap in time domain.

In an implementation, different first time units overlap in time domain. For example, the first time unit includes M second time units, and sliding is performed at a granularity of L second time units, where L is less than M. As shown in FIG. 3, the first time unit includes four slots, the second time unit includes one slot, and sliding is performed at a granularity of one slot.

In another implementation, different first time units do not overlap in time domain. For example, different first time units are connected back and forth in time domain. In another example, a first time unit #0 includes slot #0, slot #1, slot #2, and slot #3, a first time unit #1 includes slot #4, slot #5, slot #6, and slot #7, and a first time unit #2 includes slot #8, slot #9, slot #10, and slot #11, and so on.

Optionally, the terminal does not expect a configured search space to be less than a specified quantity of slots, for example, X slot, where X is a positive integer, and/or the terminal does not expect a configured search space to be less than a quantity of consecutive slots (that is, a duration field) of a PDCCH monitoring occasion of a search space. Correspondingly, a search space configured by the network side device for the terminal is less than a specified quantity of slots, and/or a search space configured by the network side device for the terminal is less than a quantity of consecutive slots (that is, a duration field) of a PDCCH monitoring occasion of a search space.

The following describes this embodiment of this application with reference to examples.

Example 1

The first search space set includes J USSs, the first time unit includes K slots, and the total blind detection resource budget on the first time unit includes a total candidate PDCCH budget B and a total CCE budget C.

Step a1: Calculate a candidate PDCCH budget B' and a CCE budget C' of the first search space set on the first time unit, where B'=B—Quantity of candidate PDCCHs of a configured CSS in the Y slots;

C'=C—Quantity of CCEs of a configured CSS in the Y slots.

Step a2: Sort the J USSs according to indexes of search spaces to form a USS set, where if a quantity of candidate PDCCEs and a quantity of non-overlapping CCEs of a $j^{th}$ USS in the USS set at the K slots are respectively B(j) and C(j), candidate PDCCH allocation may be performed by using the following code:

```
"Set j=0
While B(j)<=B' and C(j)<=C' and j<=J
``` allocating a candidate PDCCH of the $j^{th}$ USS in the K slots as a candidate PDCCH that the UE needs to monitor;

```
B'=B'-B(j);
C'=C'-C(j);
j=j+1;
end"
```

Example 2

The first search space set includes J USSs, the first time unit includes K slots, the second time unit is one slot, and the total blind detection resource budget on the first time unit includes a total candidate PDCCH budget B and a total CCE budget C.

Step b1: Calculate a candidate PDCCH budget B' and a CCE budget C' of the first search space set on the first time unit, where B'=B—Quantity of candidate PDCCHs of a configured CSS in the Y slots;

C'=C—Quantity of CCEs of a configured CSS in the Y slots.

Step b2: Sort the J USSs according to indexes of search spaces to form a USS set, where if a quantity of candidate PDCCEs and a quantity of non-overlapping CCEs of a $j^{th}$ USS in the USS set in a $k^{th}$ slot are respectively B(j, k) and C(j, k), candidate PDCCH allocation may be performed in the following manner:

Manner 1: Allocation is performed first based on a time domain location/index of a second time unit and then a search space index, an optional implementation code for candidate PDCCH allocation may be shown as follows:

```
"Set k=0;
Set j=0;
While B(j, k)<=B' and C(j, k)<=C' and j<J
While B(j, k)<=B' and C(j, k)<=C' and k<K
``` allocating a candidate PDCCH of the $j^{th}$ search space in the $k^{th}$ slot as a candidate PDCCH that the UE needs to monitor;

```
B'=B'–B(j, k);
C'=C'–C(j, k);
k=k+1;
end
j=j+1;
Set k=0;
end"
```

Manner 2: Allocation is performed first based on an index of a search space and then a time domain location/index of ae second time unit, and an optional implementation code for candidate PDCCH allocation may be shown as follows:

```
"Set k=0;
Set j=0;
While B(j, k)<=B' and C(j, k)<=C' and k<K
While B(j, k)<=B' and C(j, k)<=C' and j<J
``` allocating a candidate PDCCH of the $j^{th}$ search space in the $k^{th}$ slot as a candidate PDCCH that the UE needs to monitor;

```
B'=B'–B(j, k);
C'=C'–C(j, k);
j=j+1;
end
k=k+1;
Set j=0;
end"
```

It can be understood that performing candidate PDCCH allocation on the first frequency unit may be extended similar to the foregoing embodiment.

Example 3

The first search space set includes J USSs, the first time unit includes K slots, the second time unit is one slot, and the total blind detection resource budget on the first time unit includes a total candidate PDCCH budget B and a total CCE budget C, where different first time units overlap in time domain, as shown in FIG. 3.

Step c1: Calculate a candidate PDCCH budget B' and a CCE budget C' of the J USSs in Y slots, where B'=B—Quantity of candidate PDCCHs of a configured CSS in the Y slots;

C'=C—Quantity of CCEs of a configured CSS in the Y slots.

Step c2: Determine a slot to which a candidate PDCCH has been allocated in the Y slots, and calculate a remaining PDCCH budget B" and a remaining CCE budget C", where B"=B'—Quantity of candidate PDCCHs in the slot to which the candidate PDCCH has been allocated;

C"=C'—Quantity of CCEs on the slot to which the candidate PDCCH has been allocated.

For example, when candidate PDCCH allocation is performed on the first time unit #1, if candidate PDCCHs have been allocated to slot #1, slot #2, and slot #3 when candidate PDCCH allocation is performed on the first time unit #0, B"=B'—Quantity of candidate PDCCHs in slot #1, slot #2, and slot #3, and C"=C'—Quantity of CCEs in slot #1, slot #2 and slot #3.

Step c3: Perform, according to the remaining candidate PDCCH budget B" and the remaining CCE budget C", candidate PDCCH allocation on the J USSs in a slot to which a candidate PDCCH is to be allocated in the Y slots. For an allocation manner, refer to the foregoing example 1 and the foregoing example 2. Details are not described in this example.

It should be noted that, the control channel allocation method provided in the embodiments of this application may be performed by a control channel allocation apparatus, or a control module that is in the control channel allocation apparatus and that is configured to perform the control channel allocation method. In the embodiments of this application, an example in which the control channel allocation apparatus performs the control channel allocation method is used to describe the control channel allocation apparatus provided in the embodiments of this application.

Figure 4:
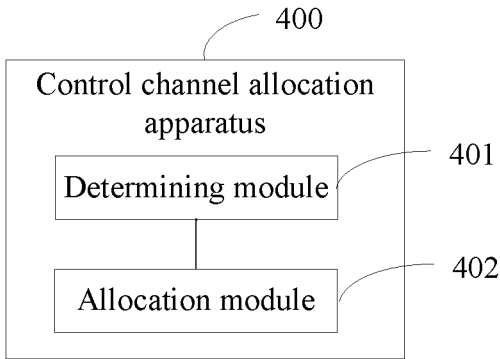
FIG. 4 is a structural diagram of a control channel allocation apparatus according to an embodiment of this application.

Referring to FIG. 4, FIG. 4 is a structural diagram of a control channel allocation apparatus according to an embodiment of this application. As shown in FIG. 4, a control channel allocation 400 includes:

a determining module 401, configured to determine a first blind detection resource budget of a first search space set on a first time unit, where the first blind detection resource budget includes at least one of a candidate physical downlink control channel PDCCH budget or a control channel element CCE budget; and an allocation module 402, configured to perform candidate PDCCH allocation on the first search space set according to the first blind detection resource budget and a first allocation rule, where the first allocation rule is related to at least one of: a search space-related index, a time domain index of a second time unit, or a frequency domain index of a first frequency unit; and the first time unit includes K second time units, a frequency associated with the first search space set includes M first frequency units, and both K and M are positive integers.

Optionally, the search space-related index includes at least one of: an index of a search space, an index of a control resource set associated with a search space, or an index of a control resource set pool associated with a search space.

Optionally, the first allocation rule includes one of the following:

performing candidate PDCCH allocation in an allocation sequence determined according to a first index, where the first index includes the search space-related index, the time domain index of the second time unit, or the frequency domain index of the first frequency unit;

performing candidate PDCCH allocation in a sequence of sequentially traversing all third indexes for each second index, where the second index is the search space-related index, the time domain index of the second time unit, or the frequency domain index of the first frequency unit, and the third index is an index different from the second index in the search space-related index, the time domain index of the second time unit, and the frequency domain index of the first frequency unit; and performing candidate PDCCH allocation in a sequence of sequentially traversing all fifth indexes for each fourth index and sequentially traversing all sixth indexes for each fifth index, where the fourth index is the search space-related index, the time domain index of the second time unit, or the frequency domain index of the first frequency unit, the fifth index is an index different from the fourth index in the search space-related index, the time domain index of the second time unit, and the frequency domain index of the first frequency unit, and the sixth index is an index different from the fifth index and the sixth index in the search space-related index, the time domain index of the second time unit, and the frequency domain index of the first frequency unit.

Optionally, the allocation module is configured to:

perform candidate PDCCH allocation on the first search space set according to the first allocation rule until a quantity of allocated blind detection resources reaches the first blind detection resource budget.

Optionally, the first search space set includes at least one of at least one common search space CSS in a third search space set or at least one specific search space USS in the third search space set; and the third search space set is a search space set in which a third serving cell set schedules a fourth serving cell set.

Optionally, the first blind detection resource budget is determined according to a total blind detection resource budget on the first time unit and a first quantity of blind detection resources; and the first quantity of blind detection resources is a quantity of blind detection resources of a second search space set on the first time unit, and the second search space set and the first search space set respectively include different search spaces in a search space set of a terminal.

Optionally, the second search space set includes at least one of at least one common search space CSS in a fourth search space set or at least one specific search space USS in the fourth search space set; and the fourth search space set is a search space set in which a third serving cell set schedules a fourth serving cell set.

Optionally, the first search space set includes the at least one USS in the fourth search space set, and the second search space set includes the at least one CSS in the fourth search space set.

Optionally, the first time unit includes at least one second time unit to which a candidate PDCCH has been allocated and at least one second time unit to which a candidate PDCCH is to be allocated.

Optionally, the apparatus further includes:

a calculating module, configured to calculate, according to the first blind detection resource budget and a quantity of allocated blind detection resources of the first search space set on the second time unit to which the candidate PDCCH has been allocated, a remaining blind detection resource budget of the first search space set on the second time unit to which the candidate PDCCH is to be allocated.

Optionally, the allocation module is configured to:

perform, according to the remaining blind detection resource budget and the first allocation rule, candidate PDCCH allocation on the first search space set on the second time unit to which the candidate PDCCH is to be allocated, and maintain candidate PDCCH allocation of the first search space set on the second time unit to which the candidate PDCCH has been allocated.

Optionally, the first time unit includes one of the following: a radio frame, a slot group, a symbol group, a slot, and a symbol.

Optionally, different first time units overlap in time domain, or different first time units do not overlap in time domain.

Optionally, the second time unit includes one of the following: a radio frame, a slot group, a symbol group, a slot, and a symbol.

Optionally, the first frequency unit includes one of the following: a carrier, a subcarrier, a bandwidth part BWP, a sub-bandwidth, and a resource block RB group.

The channel monitoring apparatus in this embodiment of this application may be an apparatus, or an apparatus or an electronic device with an operating system, or may be a component, an integrated circuit, or a chip in a terminal, or may be a component, an integrated circuit, or a chip in a network side device. The apparatus or the electronic device may be a mobile terminal, or a non-mobile terminal. For example, the mobile terminal may include but is not limited to the types of the foregoing listed terminal 11, and the non-mobile terminal may be a server, a network attached storage (NAS), a personal computer (PC), a television (TV), an automated teller machine, or a self-service machine. This is not limited in the embodiments of this application. The apparatus or the electronic device may be a network side device. For example, the network side device includes but is not limited to the type of the network side device 12 listed above.

The channel monitoring apparatus provided in this embodiment of this application can implement the processes implemented in the method embodiment in FIG. 2, and achieve a same technical effect. To avoid repetition, details are not described herein again.

Figure 5:
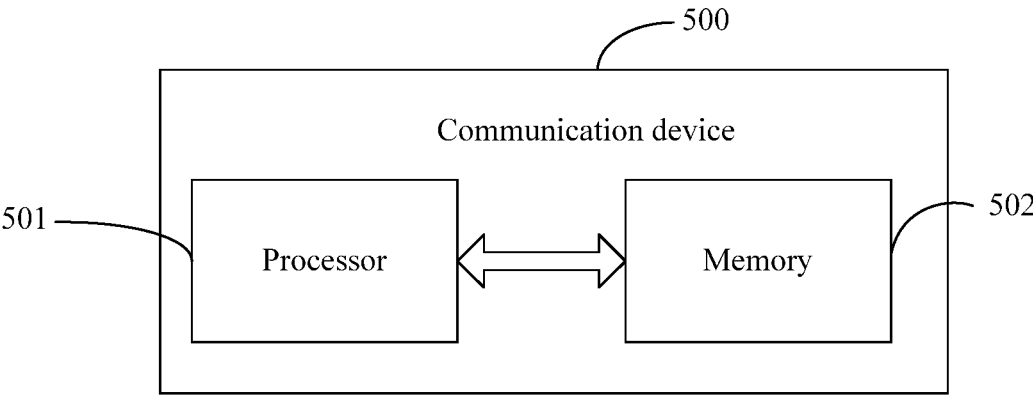
FIG. 5 is a structural diagram of a communication device according to an embodiment of this application.

Optionally, as shown in FIG. 5, an embodiment of this application further provides a communication device 500, including a processor 501, a memory 502, and a program or an instruction stored in the memory 502 and executable on the processor 501, where when the program or the instruction is executed by the processor 501, the processes of the foregoing control channel allocation method embodiment are implemented and a same technical effect can be achieved. To avoid repetition, details are not described herein again.

Figure 6:
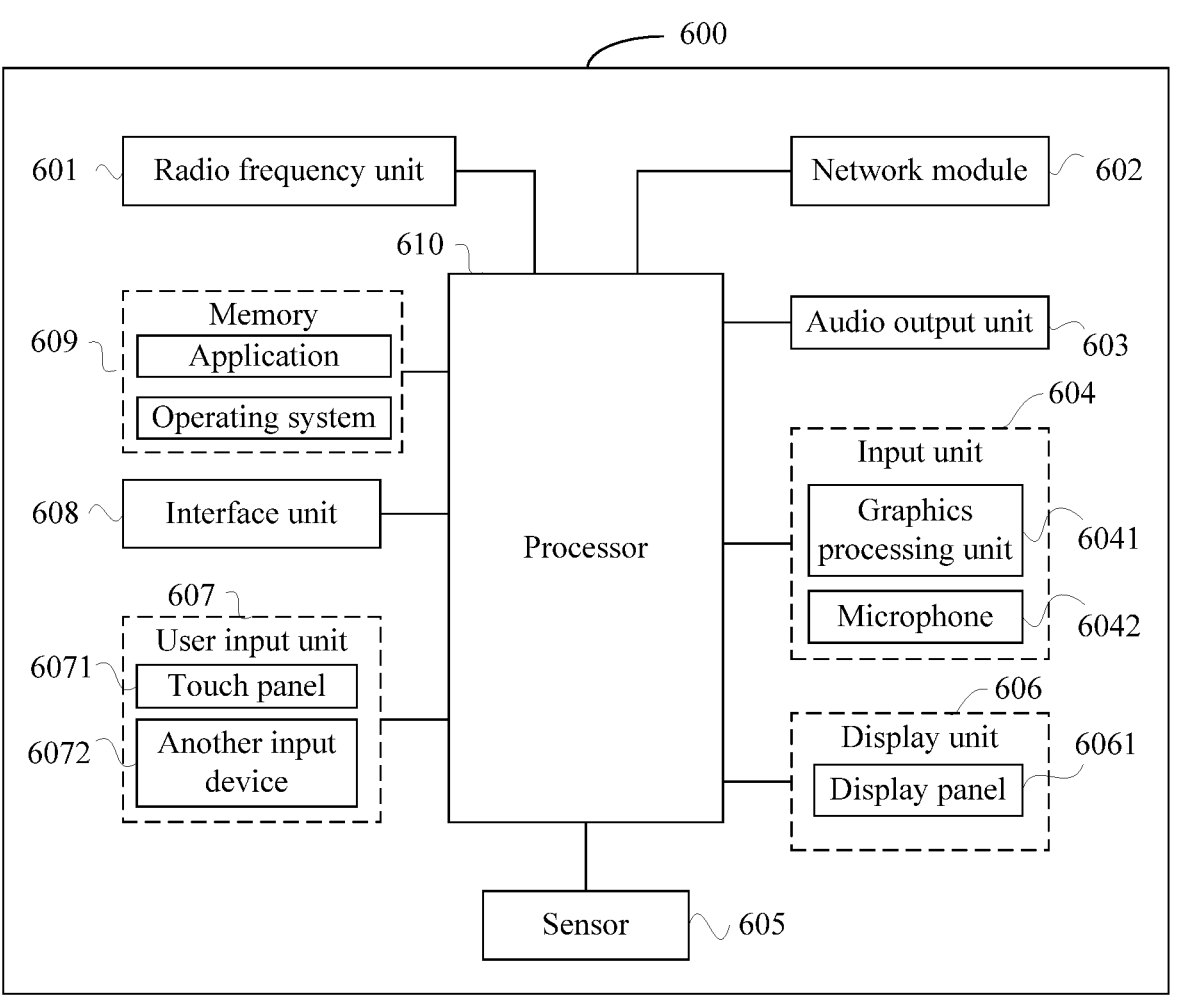
FIG. 6 is a structural diagram of a terminal according to an embodiment of this application.

An embodiment of this application further provides a terminal, including a processor and a communication interface, where the processor is configured to: determine a first blind detection resource budget of a first search space set on a first time unit, where the first blind detection resource budget includes at least one of a candidate physical down-link control channel PDCCH budget or a control channel element CCE budget; and perform candidate PDCCH allocation on the first search space set according to the first blind detection resource budget and a first allocation rule, where the first allocation rule is related to at least one of: a search space-related index, a time domain index of a second time unit, or a frequency domain index of a first frequency unit; and the first time unit includes K second time units, a frequency associated with the first search space set includes M first frequency units, and both K and M are positive integers. This terminal embodiment corresponds to the foregoing method embodiment on the terminal side. Each implementation process and implementation of the foregoing method embodiment may be applicable to this terminal embodiment, and a same technical effect can be achieved. For example, FIG. 6 is a schematic structural diagram of hardware of a terminal according to an embodiment of this application.

A terminal 600 includes but is not limited to at least a part of components such as a radio frequency unit 601, a network module 602, an audio output unit 603, an input unit 604, a sensor 605, a display unit 606, a user input unit 607, an interface unit 608, a memory 609, and a processor 610.

A person skilled in the art can understand that the terminal 600 may further include a power supply (such as a battery) that supplies power to each component. The power supply may be logically connected to the processor 610 by using a power supply management system, to implement functions such as charging and discharging management, and power consumption management by using the power supply management system. The terminal structure shown in FIG. 6 constitutes no limitation on the terminal, and the terminal may include more or fewer components than those shown in the figure, or combine some components, or have different component arrangements. Details are not described herein.

It should be understood that, in this embodiment of this application, the input unit 604 may include a graphics processing unit (GPU) 6041 and a microphone 6042, and the graphics processing unit 6041 processes image data of a still picture or a video obtained by an image capture apparatus (such as a camera) in a video capture mode or an image capture mode. The display unit 606 may include a display panel 6061. Optionally, the display panel 6061 may be configured in a form such as a liquid crystal display or an organic light-emitting diode. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include but is not limited to a physical keyboard, a functional button (such as a volume control button or a power on/off button), a trackball, a mouse, and a joystick. Details are not described herein.

In this embodiment of this application, the radio frequency unit 601 receives downlink data from a network side device and then sends the downlink data to the processor 610 for processing; and sends uplink data to the network side device. Usually, the radio frequency unit 61 includes but is not limited to an antenna, at least one amplifier, a transceiver, a coupler, a low noise amplifier, a duplexer, and the like.

The memory 609 may be configured to store a software program or an instruction and various data. The memory 609 may mainly include a program or instruction storage area and a data storage area. The program or instruction storage area may store an operating system, and an application or an instruction required by at least one function (for example, a sound playing function or an image playing function). In addition, the memory 609 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-volatile solid-state storage component.

The processor 610 may include one or more processing units. Optionally, an application processor and a modem processor may be integrated into the processor 610. The application processor mainly processes an operating system, a user interface, an application, an instruction, or the like. The modem processor mainly processes wireless communication, for example, a baseband processor. It can be understood that, alternatively, the modem processor may not be integrated into the processor 610.

The processor 610 is configured to: determine a first blind detection resource budget of a first search space set on a first time unit, where the first blind detection resource budget includes at least one of a candidate physical downlink control channel PDCCH budget or a control channel element CCE budget; and perform candidate PDCCH allocation on the first search space set according to the first blind detection resource budget and a first allocation rule, where the first allocation rule is related to at least one of: a search space-related index, a time domain index of a second time unit, or a frequency domain index of a first frequency unit; and the first time unit includes K second time units, a frequency associated with the first search space set includes M first frequency units, and both K and M are positive integers.

In this embodiment of this application, a first blind detection resource budget of a first search space set on a first time unit is determined, and candidate PDCCH allocation is performed on the first search space set according to the first blind detection resource budget and a first allocation rule. This provides a manner of performing candidate PDCCH allocation in a search space in the case of overbooking, thereby reducing complexity of performing candidate PDCCH allocation in the search space in the case of overbooking.

Optionally, the search space-related index includes at least one of: an index of a search space, an index of a control resource set associated with a search space, or an index of a control resource set pool associated with a search space.

Optionally, the first allocation rule includes one of the following:

performing candidate PDCCH allocation in an allocation sequence determined according to a first index, where the first index includes the search space-related index, the time domain index of the second time unit, or the frequency domain index of the first frequency unit;

performing candidate PDCCH allocation in a sequence of sequentially traversing all third indexes for each second index, where the second index is the search space-related index, the time domain index of the second time unit, or the frequency domain index of the first frequency unit, and the third index is an index different from the second index in the search space-related index, the time domain index of the second time unit, and the frequency domain index of the first frequency unit; and performing candidate PDCCH allocation in a sequence of sequentially traversing all fifth indexes for each fourth index and sequentially traversing all sixth indexes for each fifth index, where the fourth index is the search space-related index, the time domain index of the second time unit, or the frequency domain index of the first frequency unit, the fifth index is an index different from the fourth index in the search space-related index, the time domain index of the second time unit, and the frequency domain index of the first frequency unit, and the sixth index is an index different from the fifth index and the sixth index in the search space-related index, the time domain index of the second time unit, and the frequency domain index of the first frequency unit.

Optionally, the processor 610 is further configured to:

perform candidate PDCCH allocation on the first search space set according to the first allocation rule until a quantity of allocated blind detection resources reaches the first blind detection resource budget.

Optionally, the first search space set includes at least one of at least one common search space CSS in a third search space set or at least one specific search space USS in the third search space set; and the third search space set is a search space set in which a third serving cell set schedules a fourth serving cell set.

Optionally, the first blind detection resource budget is determined according to a total blind detection resource budget on the first time unit and a first quantity of blind detection resources; and the first quantity of blind detection resources is a quantity of blind detection resources of a second search space set on the first time unit, and the second search space set and the first search space set respectively include different search spaces in a search space set of a terminal.

Optionally, the second search space set includes at least one of at least one common search space CSS in a fourth search space set or at least one specific search space USS in the fourth search space set; and the fourth search space set is a search space set in which a third serving cell set schedules a fourth serving cell set.

Optionally, the first search space set includes the at least one USS in the fourth search space set, and the second search space set includes the at least one CSS in the fourth search space set.

Optionally, the first time unit includes at least one second time unit to which a candidate PDCCH has been allocated and at least one second time unit to which a candidate PDCCH is to be allocated.

Optionally, the processor 610 is further configured to:

calculate, according to the first blind detection resource budget and a quantity of allocated blind detection resources of the first search space set on the second time unit to which the candidate PDCCH has been allocated, a remaining blind detection resource budget of the first search space set on the second time unit to which the candidate PDCCH is to be allocated.

Optionally, the processor 610 is further configured to:

perform, according to the remaining blind detection resource budget and the first allocation rule, candidate PDCCH allocation on the first search space set on the second time unit to which the candidate PDCCH is to be allocated, and maintain candidate PDCCH allocation of the first search space set on the second time unit to which the candidate PDCCH has been allocated.

Optionally, the first time unit includes one of the following: a radio frame, a slot group, a symbol group, a slot, and a symbol.

Optionally, different first time units overlap in time domain, or different first time units do not overlap in time domain.

Optionally, the second time unit includes one of the following: a radio frame, a slot group, a symbol group, a slot, and a symbol.

Optionally, the first frequency unit includes one of the following: a carrier, a subcarrier, a bandwidth part BWP, a sub-bandwidth, and a resource block RB group.

An embodiment of this application further provides a network side device, including a processor and a communication interface, where the processor is configured to: determine a first blind detection resource budget of a first search space set on a first time unit, where the first blind detection resource budget includes at least one of a candidate physical downlink control channel PDCCH budget or a control channel element CCE budget; and perform candidate PDCCH allocation on the first search space set according to the first blind detection resource budget and a first allocation rule, where the first allocation rule is related to at least one of: a search space-related index, a time domain index of a second time unit, or a frequency domain index of a first frequency unit; and the first time unit includes K second time units, a frequency associated with the first search space set includes M first frequency units, and both K and M are positive integers. This network side device embodiment corresponds to the foregoing method embodiment on the network side device. Each implementation process and implementation of the foregoing method embodiment may be applicable to this network side device embodiment, and a same technical effect can be achieved.

Figure 7:
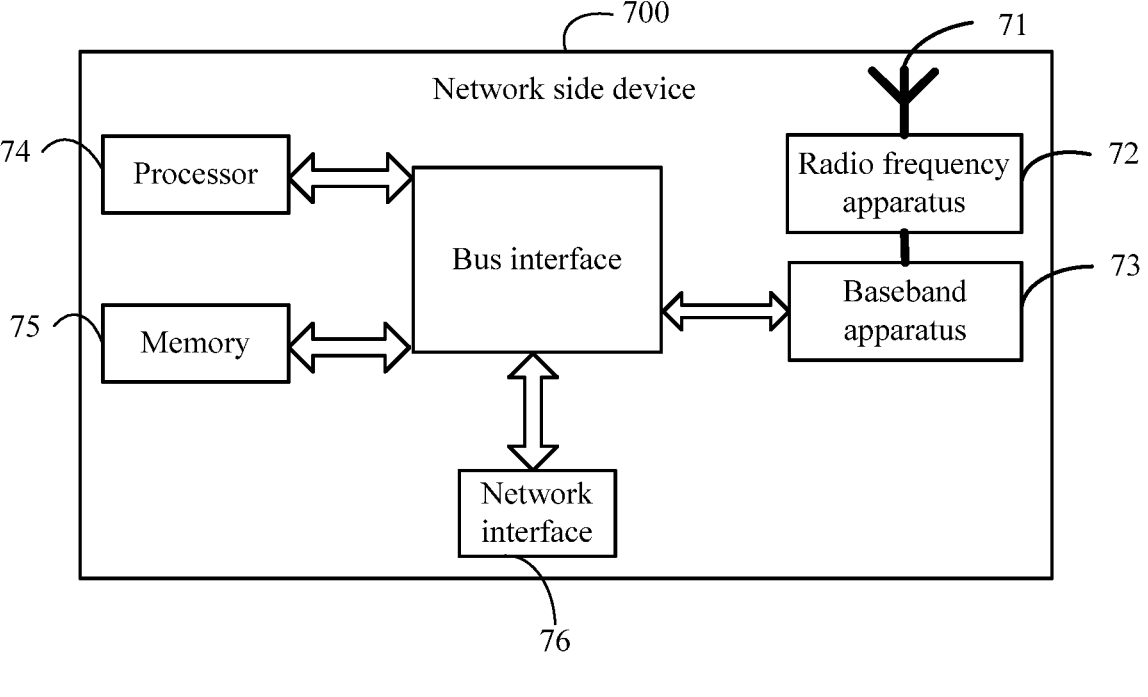
FIG. 7 is a structural diagram of a network side device according to an embodiment of this application.

For example, an embodiment of this application further provides a network side device. As shown in FIG. 7, a network side device 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and sends the received information to the baseband apparatus 73 for processing. In a downlink direction, the baseband apparatus 73 processes to-be-sent information, and sends the information to the radio frequency apparatus 72. The radio frequency apparatus 72 processes the received information and then sends the information by using the antenna 71.

The frequency band processing apparatus may be located in the baseband apparatus 73. The method performed by the network side device in the foregoing embodiment may be implemented in the baseband apparatus 73. The baseband apparatus 73 includes a processor 74 and a memory 75.

The baseband apparatus 73 may include, for example, at least one baseband board, where a plurality of chips are disposed on the baseband board. As shown in FIG. 7, one chip is, for example, the processor 74, which is connected to the memory 75, so as to invoke a program in the memory 75 to perform operations of the network side device shown in the foregoing method embodiment.

The baseband apparatus 73 may further include a network interface 76, configured to exchange information with the radio frequency apparatus 72. For example, the interface is a common public radio interface (CPRI).

For example, the network side device in this embodiment of the present application further includes an instruction or a program stored in the memory 75 and executable on the processor 74. The processor 74 invokes the instruction or the program in the memory 75 to perform the method performed by the modules shown in FIG. 4, and a same technical effect is achieved. To avoid repetition, details are not described herein again.

An embodiment of this application further provides a non-transitory computer-readable storage medium. The non-transitory computer-readable storage medium stores a program or an instruction, and when the program or the instruction is executed by a processor, the processes of the foregoing control channel allocation method embodiment are implemented and a same technical effect can be achieved. To avoid repetition, details are not described herein again.

The processor is a processor in the terminal in the foregoing embodiment, or a processor in the network side device in the foregoing embodiment. The non-transitory computer-readable storage medium includes a computer read-only memory (ROM), a random access memory (RAM), a magnetic disk, or an optical disc.

An embodiment of this application further provides a chip. The chip includes a processor and a communication interface, the communication interface is coupled to the processor, and the processor is configured to execute a program or an instruction to implement the processes of the foregoing control channel allocation method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, an air conditioner, a network side device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A control channel allocation method, comprising:
determining, by a communication device, a first blind detection resource budget of a first search space set on a first slot group, wherein the first blind detection resource budget comprises at least one of a candidate physical downlink control channel (PDCCH) budget or a control channel element (CCE) budget; and
performing, by the communication device, candidate PDCCH allocation on the first search space set according to the first blind detection resource budget and a first allocation rule, wherein the first allocation rule is related to a search space-related index; and the first slot group comprises K slots, a frequency associated with the first search space set comprises M first frequency units, and K and M are positive integers; wherein a first frequency unit is a sub-bandwidth.

2. The method according to claim 1, wherein the search space-related index comprises at least one of: an index of a search space, an index of a control resource set associated with a search space, or an index of a control resource set pool associated with a search space.

3. The method according to claim 1, wherein the first allocation rule comprises:
performing candidate PDCCH allocation per slot group in an allocation sequence determined according to a first index, wherein the first index comprises the search space-related index, a time domain index of a slot, or a frequency domain index of the first frequency unit.

4. The method according to claim 1, wherein the first allocation rule comprises one of the following:
performing candidate PDCCH allocation in a sequence of sequentially traversing all third indexes for each second index, wherein the second index is the search space-related index, a time domain index of a slot, or a frequency domain index of the first frequency unit, and the third index is an index different from the second index in the search space-related index, the time domain index of the slot, and the frequency domain index of the first frequency unit; and
performing candidate PDCCH allocation in a sequence of sequentially traversing all fifth indexes for each fourth index and sequentially traversing all sixth indexes for each fifth index, wherein the fourth index is the search space-related index, the time domain index of the slot, or the frequency domain index of the first frequency unit, the fifth index is an index different from the fourth index in the search space-related index, the time domain index of the slot, and the frequency domain index of the first frequency unit, and the sixth index is an index different from the fifth index and the fourth index in the search space-related index, the time domain index of the slot, and the frequency domain index of the first frequency unit.

5. The method according to claim 1, wherein the performing, by the communication device, candidate PDCCH allocation on the first search space set according to the first blind detection resource budget and a first allocation rule comprises:
performing, by the communication device, candidate PDCCH allocation on the first search space set according to the first allocation rule until a quantity of allocated blind detection resources reaches the first blind detection resource budget.

6. The method according to claim 1, wherein the first allocation rule is further related to at least one of: a time domain index of a slot, or a frequency domain index of the first frequency unit.

7. The method according to claim 1, wherein the first search space set comprises at least one of at least one common search space (CSS) in a third search space set or at least one user equipment-specific search space (USS) in the third search space set; and the third search space set is a search space set in which a third serving cell set schedules a fourth serving cell set.

8. The method according to claim 1, wherein the first blind detection resource budget is determined according to a total blind detection resource budget on the first slot group and a first quantity of blind detection resources; and the first quantity of blind detection resources is a quantity of blind detection resources of a second search space set on the first slot group, and the second search space set and the first search space set respectively comprise different search spaces in a search space set of a terminal.

9. The method according to claim 8, wherein the second search space set comprises at least one of at least one common search space (CSS) in a fourth search space set or at least one user equipment-specific search space (USS) in the fourth search space set; and the fourth search space set is a search space set in which a third serving cell set schedules a fourth serving cell set.

10. The method according to claim 9, wherein the first search space set comprises the at least one USS in the fourth search space set, and the second search space set comprises the at least one CSS in the fourth search space set.

11. A communication device, comprising a processor, a memory, and a program or an instruction stored in the memory and executable on the processor, wherein the program or the instruction, when executed by the processor, causes the communication device to perform:

determining a first blind detection resource budget of a first search space set on a first slot group, wherein the first blind detection resource budget comprises at least one of a candidate physical downlink control channel (PDCCH) budget or a control channel element (CCE) budget; and performing candidate PDCCH allocation on the first search space set according to the first blind detection resource budget and a first allocation rule, wherein the first allocation rule is related to a search space-related index; and the first slot group comprises K slots, a frequency associated with the first search space set comprises M first frequency units, and K and M are positive integers; wherein a first frequency unit is a sub-bandwidth.

12. The communication device according to claim 11, wherein the search space-related index comprises at least one of: an index of a search space, an index of a control resource set associated with a search space, or an index of a control resource set pool associated with a search space.

13. The communication device according to claim 11, wherein the first allocation rule comprises:

performing candidate PDCCH allocation per slot group in an allocation sequence determined according to a first index, wherein the first index comprises the search space-related index, a time domain index of a slot, or a frequency domain index of the first frequency unit.

14. The communication device according to claim 11, wherein the first allocation rule comprises one of the following:

performing candidate PDCCH allocation in a sequence of sequentially traversing all third indexes for each second index, wherein the second index is the search space-related index, a time domain index of a slot, or a frequency domain index of the first frequency unit, and the third index is an index different from the second index in the search space-related index, the time domain index of the slot, and the frequency domain index of the first frequency unit; and performing candidate PDCCH allocation in a sequence of sequentially traversing all fifth indexes for each fourth index and sequentially traversing all sixth indexes for each fifth index, wherein the fourth index is the search space-related index, the time domain index of the slot, or the frequency domain index of the first frequency unit, the fifth index is an index different from the fourth index in the search space-related index, the time domain index of the slot, and the frequency domain index of the first frequency unit, and the sixth index is an index different from the fifth index and the fourth index in the search space-related index, the time domain index of the slot, and the frequency domain index of the first frequency unit.

15. The communication device according to claim 11, wherein the program or the instruction, when executed by the processor, causes the communication device to perform:

performing candidate PDCCH allocation on the first search space set according to the first allocation rule until a quantity of allocated blind detection resources reaches the first blind detection resource budget.

16. The communication device according to claim 11, wherein the first allocation rule is further related to at least one of: a time domain index of a slot, or a frequency domain index of the first frequency unit.

17. The communication device according to claim 11, wherein the first search space set comprises at least one of at least one common search space (CSS) in a third search space set or at least one user equipment-specific search space (USS) in the third search space set; and the third search space set is a search space set in which a third serving cell set schedules a fourth serving cell set.

18. The communication device according to claim 11, wherein the first blind detection resource budget is determined according to a total blind detection resource budget on the first slot group and a first quantity of blind detection resources; and the first quantity of blind detection resources is a quantity of blind detection resources of a second search space set on the first slot group, and the second search space set and the first search space set respectively comprise different search spaces in a search space set of a terminal.

19. A non-transitory computer-readable storage medium, wherein a program or an instruction is stored in the non-transitory computer-readable storage medium, and the program or the instruction, when executed by a processor, causes the processor to perform:

determining a first blind detection resource budget of a first search space set on a first slot group, wherein the first blind detection resource budget comprises at least one of a candidate physical downlink control channel (PDCCH) budget or a control channel element (CCE) budget; and performing candidate PDCCH allocation on the first search space set according to the first blind detection resource budget and a first allocation rule, wherein the first allocation rule is related to a search space-related index; and the first slot group comprises K slots, a frequency associated with the first search space set comprises M first frequency units, and K and M are positive integers; wherein a first frequency unit is a sub-bandwidth.

20. The non-transitory computer-readable storage medium according to claim 19, wherein the search space-related index comprises at least one of: an index of a search space, an index of a control resource set associated with a search space, or an index of a control resource set pool associated with a search space.

* * * * *